INVENTORS.
Lee E. Elfes &
Leo J. Lorenz
BY
Attorneys

United States Patent Office 2,932,933
Patented Apr. 19, 1960

2,932,933
OVERLOAD RELEASE MECHANISM FOR A RECIPROCATING MOWER

Lee E. Elfes, Birmingham, and Leo J. Lorenz, Detroit, Mich., assignors to Massey-Ferguson Inc., a corporation of Maryland Original application August 5, 1954, Serial No. 447,984, now Patent No. 2,853,843, dated September 30, 1958. Divided and this application December 11, 1957, Serial No. 702,129

3 Claims. (Cl. 56—25)

The invention relates to tractor-operated mowers and more particularly mowers of the type adapted to be mounted on the body of a general purpose tractor and integrated with it so that the tractor and mower operate as a unitary machine.

This application is a division of our co-pending application Serial No. 447,984 filed August 5, 1954, now Patent No. 2,853,843.

One object of the invention is to provide improved mechanism for retaining the cutter bar in operative position while permitting it to swing back when an obstruction is encountered.

It is also an object of the invention to provide a rugged and durable side-mounted mower equipped with an efficient and reliable breakback mechanism which can be produced economically and which is easy to manipulate when the mower is attached to a tractor.

Figure 1:
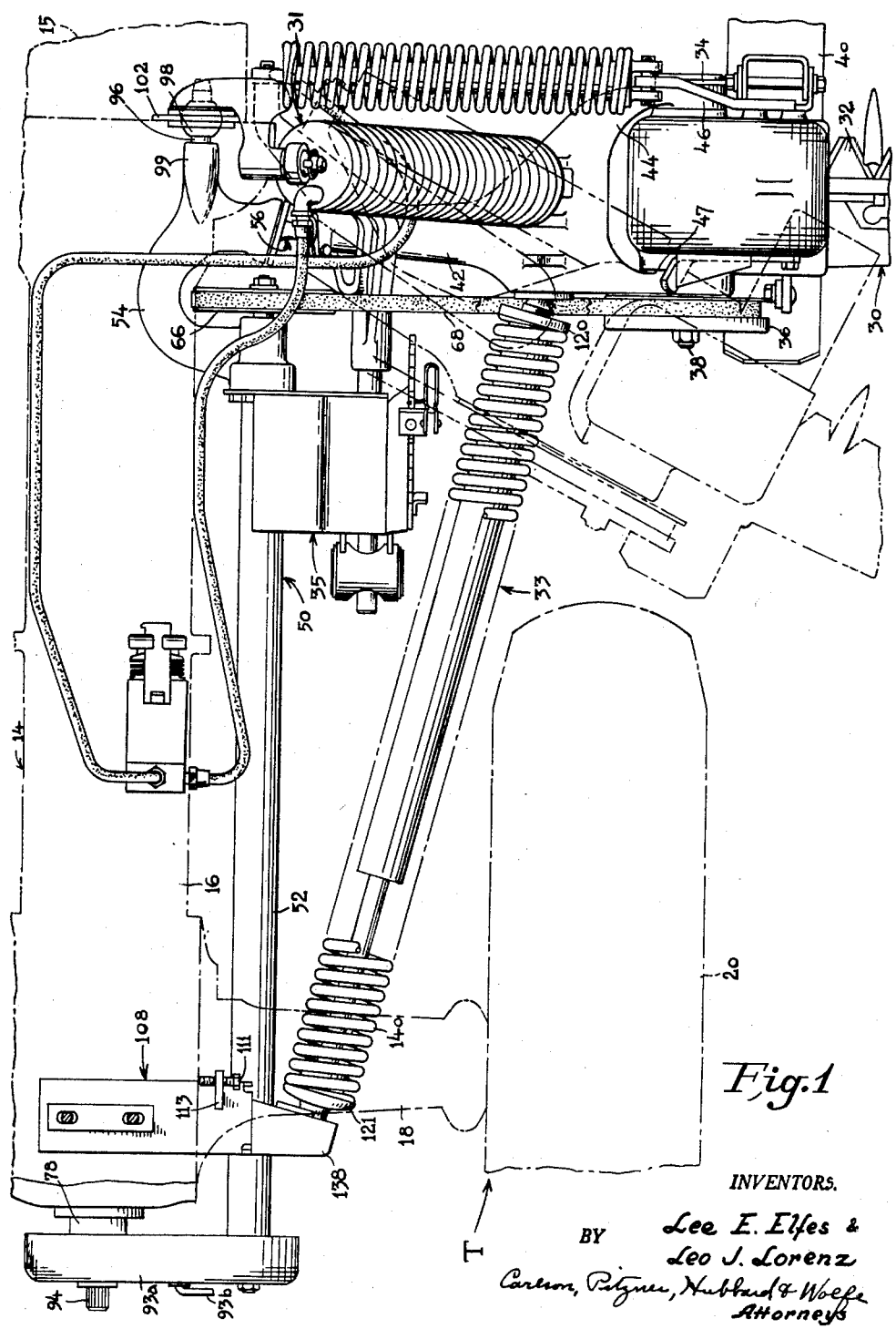

Other objects and advantages of the invention will become apparent from the following detailed description of the preferred embodiment illustrated in the accompanying drawings, in which Figure 1 is a plan view of a mower embodying the features of the invention, the mower being shown as mounted on a tractor.

Figure 2:
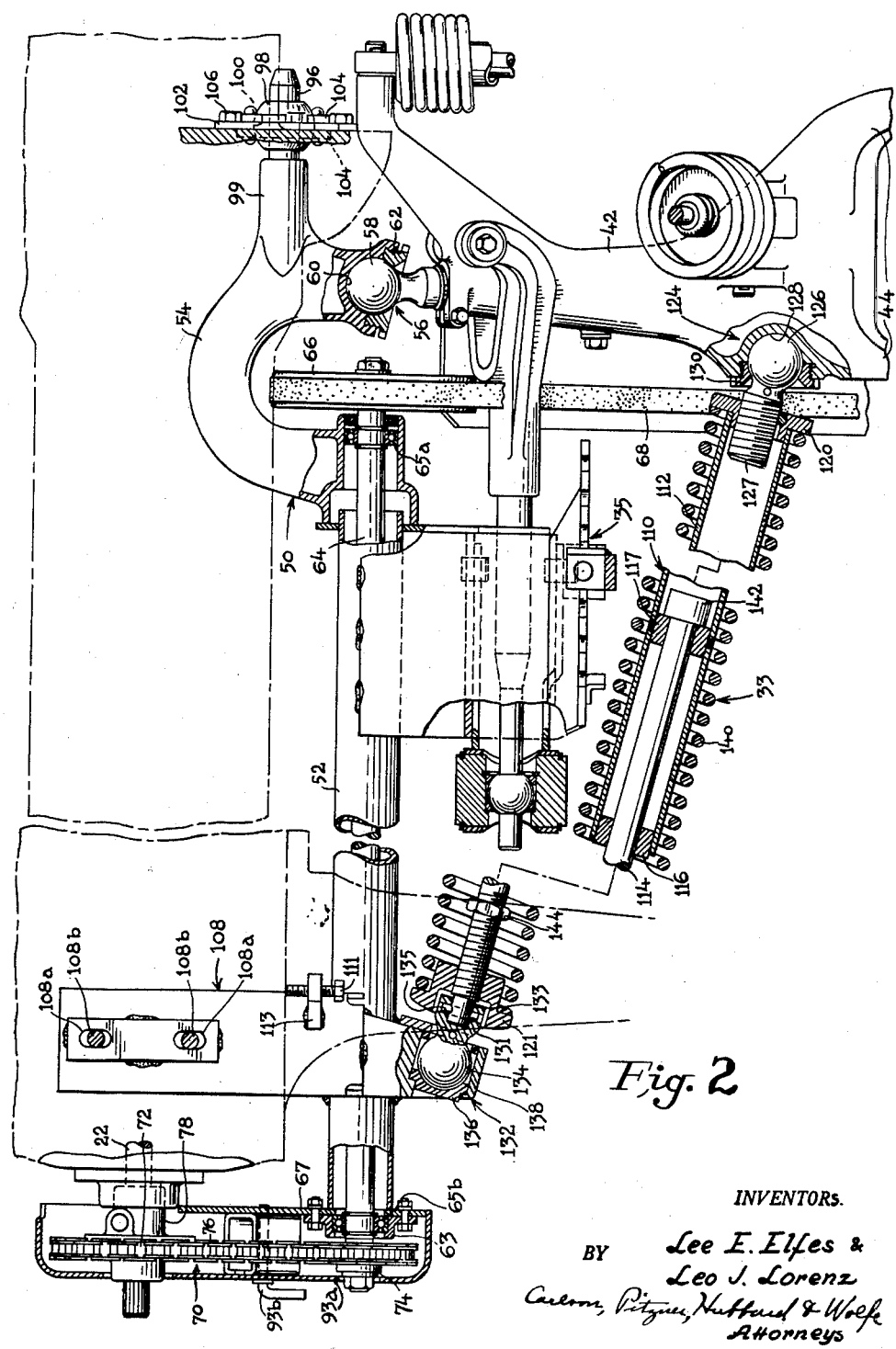

Fig. 2 is a plan view of the device shown in Fig. 1 with parts omitted and other parts broken away and shown in section.

While the invention is susceptible of various modifications and alternative constructions, there is shown in the drawings and will be described in detail the preferred embodiment and an earlier form thereof, but it is to be understood that it is not thereby intended to limit the invention to the forms illustrated but it is intended to cover all modifications and alternative constructions falling within the spirit and scope of the invention as expressed in the appended claims.

By way of orientation in the art, the mower herein disclosed may, in general, be considered as an improvement on the side-mounted mower illustrated and described in an instruction manual entitled, "Heavy Duty Mower P-EO-A21—Operating and Assembly Instructions" published in 1949 by Harry Ferguson, Inc. of Detroit, Michigan. It is designated for mounting on a tractor T having means for supplying fluid under pressure for operating the cutter bar positioning means of the mower. When mounted on a tractor equipped with a hydraulically operated implement hitch, such as the "Ferguson" tractor pressure fluid may be taken from the tractor hydraulic system. In the particular tractor illustrated provision is made for connection with the hydraulic system by interchanging a suitable fitting with a cover plate provided on the tractor center housing.

As an aid to understanding the problems involved in mounting a mower on and integrating it with a tractor, it will be well to consider briefly the general construction of the tractor. Referring to Fig. 1 of the drawings, the exemplary tractor has an elongated body 14 comprising an engine 15 and a center housing 16 assembled with the engine forward and joined as a rigid unitary structure by bolts inserted through mating flanges on the respective parts. Extending from opposite sides of the center housing adjacent its rear ends are axle housings 18 (Fig. 1) supporting the tractor's rear drive wheels 20. The wheels are driven from the tractor engine in a well-known manner through a selective change-speed transmission.

Tractors of the type shown are equipped with a rear power take-off shaft 22 (Fig. 2) adapted to be driven from the tractor engine. The power take-off shaft projects rearwardly of the center housing and through a pad formed thereon which has suitable threaded holes for attachment of a cover or for the mounting of certain accessories with which the present invention is not concerned. When the mower is mounted on the tractor, the above-mentioned cover is removed for attachment of the mower drive mechanism to be described in another divisional application.

The improved mower is adapted to be mounted directly on the body of the tractor, that is independently of the implement hitch linkage. The linkage is thus left free for attachment of other implements to the tractor which can be operated in the usual manner without requiring removal of the mower or alternatively can be retained on the tractor while the mower is operated alone. As an example, a side delivery rake or the like may be coupled to the tractor hitch linkage so that the operator can switch from mowing to raking or vice versa, as desired. It will be understood, of course, that the mower and the rake or other implement attached to the hitch linkage can be operated simultaneously if desired.

As in conventional mowers, the main operating element of the improved mower is an elongated cutter bar 30. The cutter bar is supported for pivoting movement about a fore-and-aft axis at the outer end of a drag bar 42 which, at its inner end, is supported for universal swinging and swiveling movements on a frame structure 50 mounted on the tractor. Power actuating means 31, in this instance hydraulically operated, is provided for swinging the cutter bar and the drag bar between their operating and inactive positions. Breakback mechanism 33 normally holds the cutter bar in laterally projecting relation to the tractor, as shown in full lines in Fig. 1, but permits it to swing rearwardly to the position shown in broken lines in case the cutter bar strikes an obstruction. Mechanism 35 is provided for rocking the drag bar and attached cutter bar about an axis transverse to the tractor to adjust the fore-and-aft tilt of the latter.

To obtain its broad objective of simplifying attachment and detachment, the major components of the mower referred to generally above, together with mechanism for driving the cutter bar from the power take-off shaft, are constructed and assembled to form a unitary structure adapted to be mounted on and dismounted from the tractor as a unit. In other words, the various elements of the mower are assembled and more or less permanently interconnected before they are mounted on the tractor and the assembly remains intact after removal of the tractor. This materially reduces the labor involved and shortens the time required for mounting and dismounting, and, in addition, insures proper interconnection and adjustment of the mower parts. Furthermore, handling and storage of the mower is simplified and loss or misplacement of parts is avoided.

Turning now to a more detailed description of the exemplary mower and referring to Figs. 1 and 2 of the drawings, the cutter bar 30 may be of any preferred form, including the usual toothed knife 32 reciprocated by a driving head 34 to which the inner end of the bar is attached. The drivehead 34 likewise may be of any preferred character and as shown is adapted to receive power by way of a pulley 36 fixed on the projecting end of a shaft 38 journaled in the head. The head also carries a ground shoe 40 adapted to ride along the surface of the ground when the mower is in operation. It will be understood, of course, that the cutter bar may also be provided at its outer end with a conventional ground shoe which with the shoe 40 serves to hold the cutter bar clear of the ground.

As shown in Figs. 1 and 2, the cutter bar 30 is supported on the drag bar 42 through the medium of the drivehead 34. For this purpose the outer end of the drag bar is bifurcated to form a yoke 44 adapted to straddle the head and the latter is pivotally supported on the legs of the yoke as by front and rear trunnions 46 and 47. The shaft 38 is located coaxially of the trunnions so that the cutter bar and drivehead may be swung about their pivots on the drag bar without interfering with the drive.

The frame structure 50 constitutes the backbone of the mower and ties the elements together into a unitary structure, and, in addition, serves to support the major elements of the mower on the tractor. In its preferred form, the frame structure 50 comprises an elongated tubular rear member 52 rigidly joined to the rear leg of a U-shaped front member 54 disposed so as to open laterally of the rear member. Preferably, the drag bar 52 is mounted on the forward leg of the member 54 by a suitable joint 56 permitting universal swinging and swiveling of the bar. The joint 56, as shown, is a ball and socket joint comprising a ball element 58 (Fig. 2) fixed on or rigidly secured to the inner end of the drag bar and seated in an outwardly facing spherical socket 60 formed in the member 54. A retaining nut 62 threaded into the mouth of the socket retains the ball element therein.

The frame structure 50, as indicated above, supports the mechanism for driving the cutter bar from the tractor power take-off shaft which is characterized by its compactness and simplicity. Thus, the drive mechanism includes a shaft 64 extending axially through the tubular frame member 52 and journaled in front and rear bearings 65a and 65b (Fig. 2). The bearing 65a as shown is seated in a recess in the front frame member 54 disposed so as to aline the shaft 64 axially with the axis of the ball joint 56. Bearing 65b is carried in a retainer 63 bolted or otherwise secured to a heavy plate 67 fixed to the rear end of the frame member 52.

The shaft 64 projects into the space between the legs of the frame member 54 and on its projecting end carries a pulley 66 drivingly connected with the pulley 36 of the drivehead by a V-belt 68. It will be observed that the U-shaped form of the frame member 54 provides clearance for the pulley 66 and permits the shaft 64 to be coaxially alined with the axis of the ball and socket joint 56. Thus, as the drag bar and cutter bar are swung vertically about the joint 56, the distance between the pulleys 36 and 66 remains constant so that the tension of the belt is not affected nor the drive interfered with in any way.

It will also be noted that the improved drive mechanism imposes no restraint on the drag bar 42 so that the latter may swing rearwardly with the cutter bar as a unit when the latter strikes an obstruction. The long lever arm thus provided insures a quick and effective breakback action when the cutter bar strikes an obstruction anywhere along its length, and particularly when the obstruction is met by the inner end of the bar.

Connection between the drive shaft 64 and the power take-off shaft 22 of the tractor is effected through the medium of a chain-type drive 70 (Fig. 2). As herein shown, the drive comprises a sprocket 72 on the power take-off shaft and a sprocket 74 on the shaft 64. A roller chain 76 drivingly connects the sprockets. As a safety precaution, the drive 76 is covered by a removable guard 93a. As shown in Fig. 2, the guard is clamped by a screw 93b to a spacing member 85 welded or otherwise secured to the rear face of the plate 67.

The unitary assembly of the mower elements with the frame 50 contributes substantially to the ease of mounting and dismounting the mower and those operations are further simplified and facilitated by the novel mode of attachment of the frame to the tractor. More particularly, provision is made for attaching the frame to the tractor at two points spaced apart fore and aft of the tractor, the attaching means comprising simple, easily applied attaching elements. Thus at the front end of the frame there is provided a connecting element in the form of a pin 96 adapted for engagement with a cooperating apertured element 98 permanently mounted on the body of the tractor. In the particular form of the frame illustrated, the pin 96 is suitably anchored in a boss 99 integral with and projecting forwardly from the frame member 54.

The apertured connecting element 98 is preferably in the form of a ball and is supported for free turning movement in a socket 100 formed in an apertured mounting bracket 102 and a pair of retaining plates 104 secured at opposite sides of the bracket. The bracket 102 may be conveniently secured to the tractor as by bolts 106 which are normally provided for joining the abutting flanges of the engine and the housing 16. The bracket projects only a short distance laterally of the tractor body and interferes in no way with the normal operation of the tractor. Accordingly, it may be left in place when the mower is dismounted so that remounting is further facilitated.

For attaching the rear portion of the frame 50 to the tractor, a laterally projecting bracket 108 is welded or otherwise secured to the frame member 52 adjacent its rear end. The bracket which may comprise a metal stamping is channel shaped in cross-section and is disposed in inverted position so as to present its upper face as a flat, horizontal bearing surface adapted to fit flush against a pad provided on the tractor center housing for mounting a swinging draw bar. Slots 108a in the bracket are spaced apart to receive the bolts 108b ordinarily supplied for attachment of the draw bar. The slots are elongated in a direction to permit lateral swinging of the frame about the axis of the ball 98 as a pivot after attachment of the bracket 108 to the tractor. Thus, the frame may be swung inwardly of the tractor to permit easy placement of the chain 76 over the sprockets 72 and 74 after which the frame can be swung outwardly to tension the chain. The bolts 108b of course are tightened when the frame is properly positioned and they, together with an adjusting screw 111, securely hold the frame in such position. As shown in Fig. 2, the adjusting screw is threaded through a lug 113 welded to the upper face of the bracket 108 and its inner end is disposed for engagement with an adjacent portion of the tractor center housing.

The breakback mechanism 33 which constitutes the subject matter of the instant application normally holds the cutter bar in correct operating position while permitting it to swing rearwardly when an obstruction is encountered. In its preferred form, it comprises a spring loaded compression member 110 connected between the drag bar 42 and the frame structure 50. As shown in Fig. 2, the compression member 110 comprises a pair of telescopingly assembled elements including an outer element in the form of a tube or cylinder 112 and an inner element or rod 114. The latter is disposed axially within the tube and is slidably supported in guide collars 116 and 117 fitted in the tube. Mounted on the telescoped elements 112 and 114 are front and rear plugs 120 and 121, the front plug being welded or otherwise rigidly fixed to the forward end of the tube 112 while the rear plug 121 has a threaded connection with the rod 114. The compression member is connected at its forward end to the drag bar 42 by connecting means 124, permitting universal pivotal movement between the parts. The connecting means as shown is of the ball and socket type comprising a ball 126 formed at the end of a stud 127 screw-threaded into the front plug 120. The ball is adapted to seat in a socket 128 formed in and opening rearwardly of the drag bar 42. A retainer nut 130 threaded into the mouth of the socket retains the ball in place.

A similar ball and socket connection 132 secures the other end of the compression member to the frame structure. As shown in Fig. 2, the connection comprises a ball 134 having an integral shank portion 131 apertured to receive the reduced end portion 133 of the rod 114. A cross pin 135 inserted through the shank and rod secures the parts together. The ball 134 seats in a spherical socket defined by a member 136 mounted in an extension 138 of the bracket 108 which, as previously explained, is fixed to and supports the tubular frame member 52 on the tractor housing.

Disposed around the telescopingly engaged members 112 and 114 is a coiled compression spring 140 having its ends abutting circumferential flanges on the front and rear plugs 120 and 121. Adjustment of the loading of the spring 140 may be effected by screwing the plug 121 along the rod 114. To limit extension of the telescoping members beyond the length required to locate the cutter bar in operating position, the rod 114 is formed at its forward end with an enlarged head 142 engageable with the guide sleeve 117 in the tube 112. Collapse or contraction of the telescoping elements is similarly limited by a stop nut 144 threaded on the rod 114 and engageable by the guide sleeve 116.

In the above arrangement, the cutter bar is held substantially at right angles to the axis of the tractor as long as normal operating conditions prevail. If the cutter bar encounters an obstruction which is sufficiently unyieldable to overcome the force of the spring 140, the cutter bar and drag bar swing rearwardly on breakback about the ball and socket joint 56 as a pivot. Such rearward movement is limited to substantially the position in which the parts are shown in broken lines in Fig. 1, as determined by the position of the stop nut 144, the setting automatically being such as to prevent the cutter bar from hitting the adjacent rear wheel of the tractor.

It will be evident that the force required to initiate a breakback of the cutter bar is dependent upon the initial loading of the spring 140 as determined by the adjustment of the plug 121 along the rod 114. This makes for dependable, consistent operation of the breakback mechanism since the strength and adjustment of the spring are not subject to variation due to uncontrolled factors, such as corrosion, faulty or inadequate lubrication or accumulation of dirt on the working parts. The frictional resistance offered by the spring-loaded compression loader 110 itself is negligible. This is in contrast with the conventional latch-type breakback mechanism in which the interaction of frictional force is a vital factor in determining the force required to initiate a breakback operation. Rust and other factors of deterioration are likely to cause erratic variations in the action of such conventional arrangement and, of course, such variations are completely avoided by the improved mechanism.

When an obstruction is encountered by the cutter bar, the spring 140 absorbs the shock of the impact. Normally, the operator of the tractor will stop the tractor as soon as breakback occurs. In the event that the cutter bar should reach the limit of its rearward swinging movement before the tractor can be halted, the energy absorbing action of the spring will substantially reduce the peak loading on the implement. There is no such energy absorbing action in the conventional latch type breakback mechanism since the resistance offered by such mechanisms drops substantially to zero once breakback has been initiated. Furthermore, since the spring-loaded breakback mechanism 110 of the improved mower is carried between the drag bar and the frame structure 50 of the mower, no separate connection to the tractor is required.

It may also be noted that with the construction and arrangement shown, reciprocation of the cutter bar is automatically interrupted upon the occurrence of a breakback. Such interruption is effected automatically by the slacking off of the drive belt 68 which takes place by reason of the fact that the pivotal axis of the drag bar at the ball and socket joint 56 is offset forwardly from the drive pulley 66 on the shaft 64. Thus the swinging of the drag bar in a horizontal plane is effective to interrupt the drive for the cutter bar while the driving connection is retained during vertical swinging of the drag bar.

It will be evident from the foregoing that a mower constructed in accordance with the invention presents substantial advantages over previous side-mounted mowers. The simple, sturdy frame structure 50 supports all of the major components of the mower, including the cutter carrying drag bar 42, the breakback mechanism 33, the tilt mechanism 35 and the drive mechanism for transmitting power from the tractor power take-off shaft to the cutter bar drivehead. Moreover, those components are all assembled with the frame in a unitary structure adapted for mounting on and removal from the tractor as a unit. Since the mower parts are connected together at all times, the mower is easy to handle when dismounted and there is little likelihood of any parts becoming lost or misplaced.

Important advantages are realized from the novel construction and relationship of parts in addition to the ease of mounting and dismounting the mower. Thus, the drive mechanism is materally simpler in construction than drive mechanism heretofore required for side-mounted mowers. In particular, it is to be noted that no universal joints are required which reduces manufacturing costs and simplifies maintenance. Furthermore, the location of the main drive shaft within the frame structure makes it possible to utilize the pivoted mounting of the drag bar for breakback, or in other words, to allow the drag bar and cutter bar to break back as a unit when the latter strikes an obstruction. This is particularly advantageous in providing more leverage when the obstruction is met by the inner end of the cutter bar.

The breakback mechanism itself operates in an advantageous manner since the force required to initiate a breakback depends entirely upon the initial loading of the spring 140. The strength and adjustment of the spring is not subject to variation due to uncontrolled factors, such as corrosion, faulty or inadequate lubrication or accumulation of dirt on the working parts. Moreover, the frictional resistance offered by the spring-loaded member 110 is negligible. Accordingly, uniform, dependable operation of the breakback mechanism is insured under all conditions.

We claim as our invention:

1. In a mower attachment for a tractor, the combination comprising an elongated supporting member, cooperating coupling elements on the tractor and said member detachably mounting the supporting member in a fore-and-aft position on one side of the tractor, a drag bar, means pivotally connecting the inner end of the drag bar to the supporting member adjacent its forward end for swinging movement in a horizontal plane, a cutter bar pivotally connected to the outer end of the drag bar for swinging movement in a vertical plane, a compression coil spring interposed between the outer end of said drag bar and a point on the supporting member located adjacent its rear end prestressed to exert sufficient force to hold the drag bar and the mower bar in a laterally extending position, said spring yielding under pressure to allow the drag bar and the mower bar to swing rearwardly in the event that the cutter bar should encounter an obstruction, and a pair of telescopically-engaged guide members disposed within said spring, said guide members having respective interengageable stop elements for restricting movement of the cutter bar within predetermined limits in either direction.

2. In a mower assembly for a tractor, in combination, an elongated frame structure adapted to be mounted on and to extend along one side of the tractor, a drag bar and pivot means supporting it at one end on said frame structure for universal swinging movement, a cutter bar and pivot means supporting it at the other end of said drag bar to swing about a generally fore-and-and-aft axis, means normally operative to hold said drag bar and said cutter bar in laterally projecting relation to the tractor including a compression spring interposed between said frame structure and said drag bar prestressed to yieldably urge the latter forwardly to a working position but adapted to yield and permit rearward movement of the drag bar when the cutter bar meets an obstruction, and cooperating stops in said holding means defining the limit position to which the drag bar is urged by said spring.

3. In a mower assembly for a tractor, in combination, an elongated frame structure having means for mounting it on and to extend along one side of the tractor, a drag bar and means securing it at one end on said frame structure for universal swinging movement, a cutter bar and means securing it at the other end of said drag bar to swing about a generally fore-and-aft axis, a pair of telescoping members respectively connected to said frame structure and said drag bar, spring means interposed between said frame and said drag bar urging the bar in a forward direction effective to extend said members, said spring yielding to permit rearward horizontal movement of the drag bar and the collapse of the telescoping member when the cutter bar meets an obstruction, said connections between the telescoping members, the frame structure and the drag bar affording universal pivotal movement to accommodate vertical as well as horizontal swinging of the drag bar.

References Cited in the file of this patent

UNITED STATES PATENTS

| | | |
|---|---|---|
| 2,580,267 | Abgarian | Dec. 25, 1951 |

FOREIGN PATENTS

| | | |
|---|---|---|
| 507,579 | Belgium | Dec. 31, 1951 |
| 513,659 | Belgium | Sept. 15, 1952 |